United States Patent [19]

Merz

[11] Patent Number: 4,615,648
[45] Date of Patent: Oct. 7, 1986

[54] CONVEYANCE SYSTEM FOR TRANSPORTING POWDERY OR GRANULAR MATERIAL

[75] Inventor: Walter Merz, Küsnacht, Switzerland

[73] Assignee: Swiss Aluminium Ltd., Chippis, Switzerland

[21] Appl. No.: 177,730

[22] Filed: Aug. 13, 1980

[30] Foreign Application Priority Data

Aug. 28, 1979 [CH] Switzerland .................. 7853/79

[51] Int. Cl.⁴ .................................... B65G 53/58
[52] U.S. Cl. ........................................... 406/95
[58] Field of Search ........................... 406/93–95, 406/190, 191, 192, 86, 87, 88, 89; 138/111, 113

[56] References Cited

U.S. PATENT DOCUMENTS 3,537,755 11/1970 Schmidt ............................. 406/95
3,626,986 12/1971 Aarburg ........................... 406/191
3,929,379 12/1975 Krambrock ......................... 406/95
4,002,372 1/1977 Edwards et al. .................... 406/94
4,116,491 9/1978 Leslie ............................... 406/89

FOREIGN PATENT DOCUMENTS 683628 6/1930 France ............................... 406/75

Primary Examiner—Jeffrey V. Nase
Attorney, Agent, or Firm—Bachman & LaPointe

[57] ABSTRACT

Compressed air is introduced into a feed pipe system for transporting powdery or granular material in order to promote dense flow conditions. Variable or fixed size restrictions with decreasing size of blocking surface in the direction of the material flow equalize the amount of air entering the feed pipe along its entire length. The compressed air is introduced into the feed pipe through porous materials positioned at least in the region of the restrictions.

11 Claims, 5 Drawing Figures

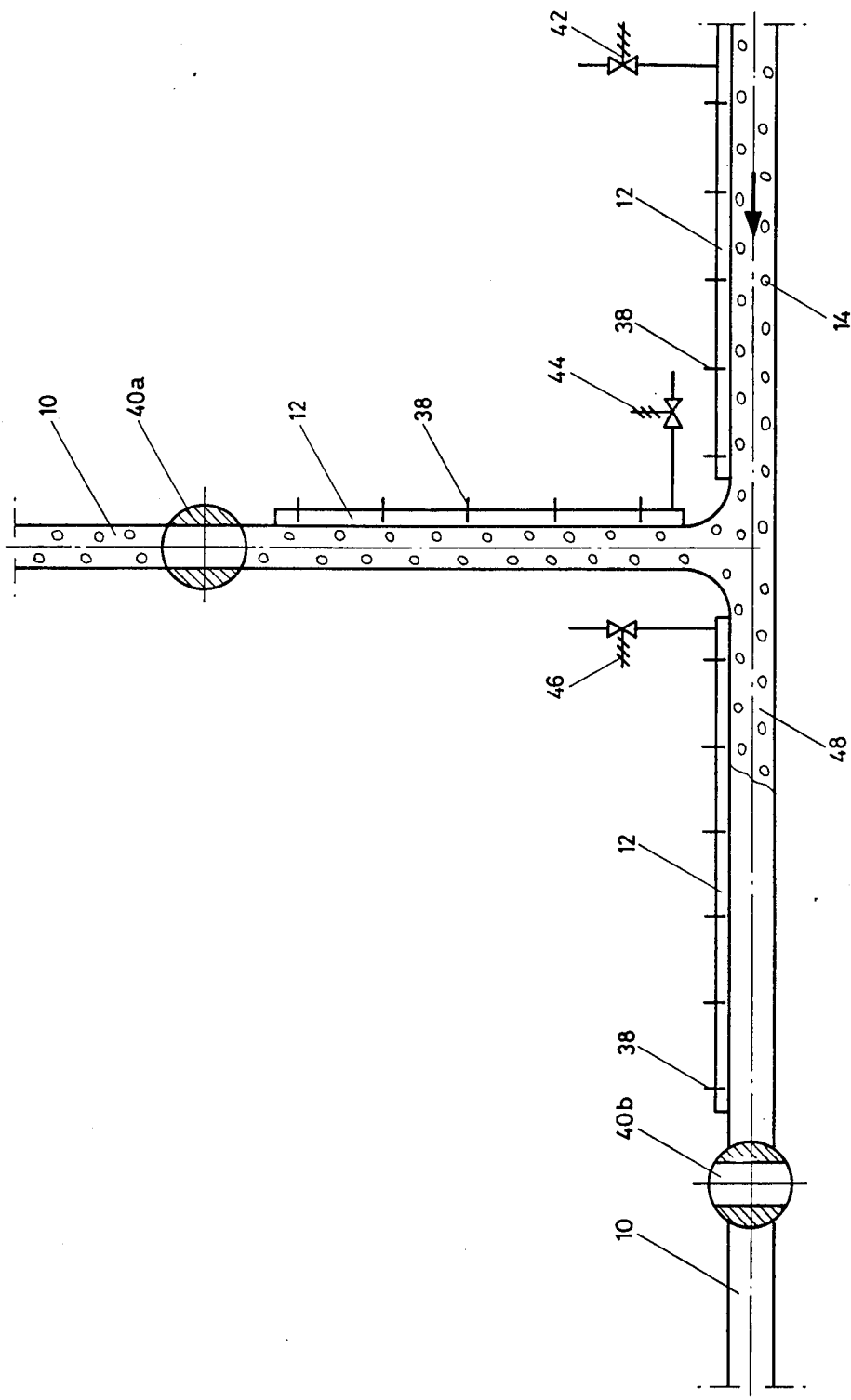

CONVEYANCE SYSTEM FOR TRANSPORTING POWDERY OR GRANULAR MATERIAL

BACKGROUND OF THE INVENTION

The present invention relates to a conveyance system for powdery or granular material which is transported in a dense stream by means of compressed air fed into the pipe line.

It is known that a minimum flow rate must be exceeded in pneumatic conveyance pipes, otherwise, below this so-called blockage limit the resistance due to the material in the pipe becomes so large that the pneumatic pressure is no longer adequate to move the material.

One method which has been adopted to prevent possible blockage of the pipe is to introduce a porous pipe of smaller diameter into a pipe which is impermeable to air. The remaining, free space between the pipes is filled with compressed air to loosen up the material being transported. This allows the blocking tendency to be reduced, however, a minimum flow rate, even though a reduced rate, must still be exceeded.

A device to remove powdery or granular material from a horizontal or inclined supply pipe has been suggested whereby the material is conveyed by compressed air from a lower into an upper, parallel pipeline. Both pipelines for the material and for the compressed air are connected via a porous base which extends basically over the whole length of the pipe. The air is able to pass through this porous base and maintain the loose character of the material.

This device has, however, the disadvantage that the greater part of the compressed air follows the path of least resistance and enters, at the end of the lower compressed air pipeline, into the upper pipe containing the material where the resistance is several orders of magnitude greater than in the empty lower pipeline. On the other hand at the start of the feed pipe or in the middle stretch almost no compressed air from the lower pipe enters the upper pipe, which is a disadvantage when trying to achieve a dense flow of material. Dense flow is not defined as a number itself but as a ratio where $$\mu = \frac{\text{Weight of loose material}}{\text{Weight of air}}$$

which as a rule lies above a value of 50.

Dense flow transportation is of great economic importance, as the alternative viz., dilute flow requires the material being transported to reach a high flow rate in the pipe in order to achieve a reasonable level of throughput. This, in turn, results in high energy consumption and high wear rates.

It is therefore a principal object of the present invention to develop a feed pipe system which allows powdery or granular material to be transported in a dense stream with a minimum expenditure of energy and such that the wear on the feed pipe will be so slight that the pipe will have a service life of several years. The feed pipe system should be conceived in such a way that at the end of the feeding process, the pipe does not have to be blown empty.

SUMMARY OF THE INVENTION

The foregoing object is achieved by way of the present invention in that to equalize the weight of air entering the pipe over its whole length restrictions are built into the compressed air pipe such that the surface areas providing resistance to air flow decrease in the direction of material flow, and the interface from the compressed air pipe to the pipe for material transport is made of porous material, at least in the region of the restrictions.

The transportation of fine granular materials on an industrial scale is carried out using feed pipes which have an inner diameter of 50–100 mm and are usually, for economic reasons, made of steel. At least parts of the pipe according to the invention, preferably also made of steel, are made of porous material e.g. sintered bronze, sintered iron or sintered aluminum oxide, whereby the porous materials make up only a small part of the sidewall of the feed pipe.

The porous meterial can be secured in place in recesses using some suitable means for this such as by shrinking or gluing and, in the case of steel pipes and metallic porous materials, also by soldering.

The cross section of a feed pipe can be of any desired design; however round cross sections have been found particularly favorable.

The compressed air pipe running parallel to the feed pipe can likewise be of any desirable cross section; however, pipes of round or rectangular cross section can usefully be positioned beside, in or around the feed pipe.

The air flow restrictions (d in FIG. 1), which are defined by the air flow restriction means and the wall of the feed pipe, increase in size in the direction of material flow and are distributed along the entire length of the feed pipe. These restrictions cause the amount of air entering the feed pipe via the porous material to be equalized along the length of the pipe due to the uniformly spaced reductions in cross section in the compressed air pipe. In other words most of the compressed air no longer enters the feed pipe at its end where the resistance is lowest.

Restrictions of fixed size can be produced for example by indentations in the wall of the compressed air pipe or by bolts, fins or profiled sections fixed to the pipe walls. Variable restrictions on the other hand can be achieved by means of screws or bolts which can be adjusted electromagnetically or via an adjusting screw.

To obtain an optimal effect the cross section of such restrictions constitutes at least half of the cross section of the feed pipe.

The provision of restrictions in the air pipe makes sense only if the feed pipe in their vicinity is made of a porous material, otherwise the uniform input of air over the whole length of the pipe can not be achieved. The spacing of the restrictions can for example be 1–6 times the diameter of the feed pipe.

BRIEF DESCRIPTION OF THE DRAWINGS

Examples of the present invention will be described with the help of the figures wherein

FIG. 5 is a branch of the feed pipe system.

DETAILED DESCRIPTION

Figure 1:
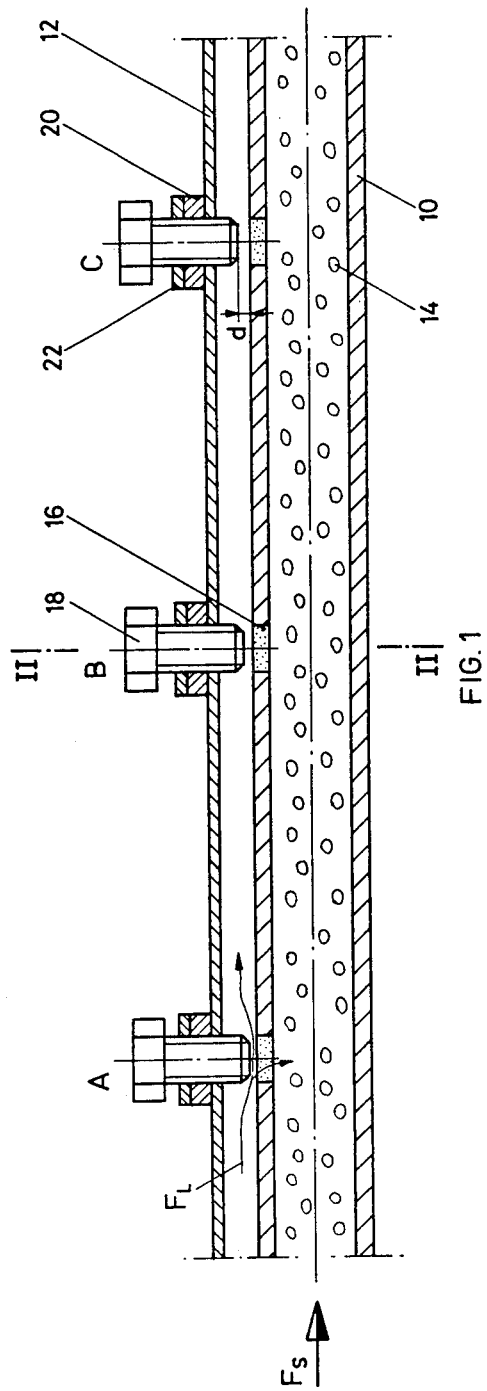
FIG. 1 is a length of feed pipe system shown in longitudinal cross section and featuring adjustable screws as variable restrictions.

FIG. 1 shows a straight length of the feed pipe system according to the present invention. A steel pipe 10, which is ring-shaped in cross section and in which the powdery or granular material 14 is transported, has an inner diameter of 70 mm and a wall thickness of approximately 3 mm. Welded to the feed pipe 10 is a compressed air pipe 12 which is rectangular in cross section. In the upper part of the feed pipe wall are openings into which porous discs 16 have been soldered, and above this porous material is an air flow restriction means in the form of adjustable screw 18 of approximately the same diameter. The area of the lower end face of this screw usefully corresponds to that of the porous material i.e. its horizontal surface area. This end face can, however, also be hemispherical, rounded or the like.

As the wall of the compressed air pipe 12 is too thin to carry a thread, a threaded part (female part) 20 is welded onto it. A bolt 22 is used to hold the adjustable screw at its setting.

The adjustable screws have the following functions:
(a) To regulate the amount of air entering the feed pipe.
(b) To regulate the amount of air flowing through the compressed air pipe.

Figure 2:
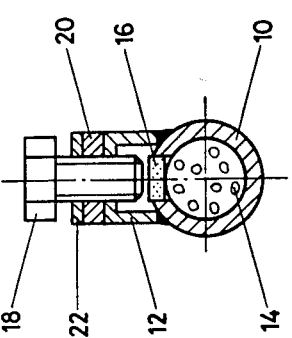
FIG. 2 is a cross secion along II—II in FIG. 1.

In the example shown, as can be seen in FIG. 2, the dimensions of the remaining opening in the compressed air pipe and the part of the adjustable screw projecting into that pipe are of a comparable order of magnitude.

The distance d of the adjustable screw to the porous material in the feed pipe is set taking into account the following parameters:
(a) The kind of material being transported.
(b) The length of the feed pipe.
(c) The porosity in the sintered bronze 16.

If the air $F_L$ is introduced into the compressed air pipe in the direction of the arrow, then the resistance in the feed pipe 10 is smallest at the adjustable screw C i.e. most of the air enters the pipe 10 at that point. At A on the other hand the resistance in the feed pipe 10 is relatively large and therefore only a small amount of air enters at that point. This causes the material right of C to be pushed forwards and that left of C to be pushed along after it in the direction of the arrow $F_S$.

In a model of the device according to the present invention in which the feed pipe is made of glass this packet-type transport can be observed very well.

Figure 3:
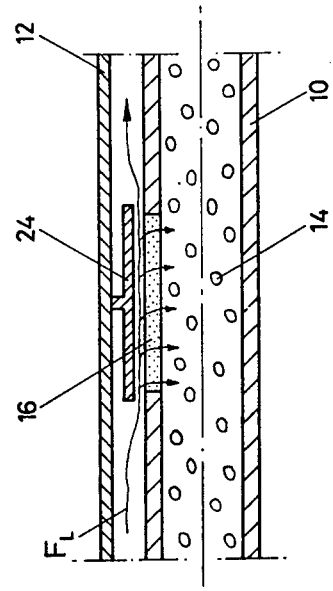
FIG. 3 is a longitudinal cross section through a restriction which is in the form of a profiled piece in the compressed air pipe.

In contrast to the adjustable air flow restrictions in FIGS. 1 and 2, the air flow restrictions in FIG. 3 are of the permanent, fixed type. A air flow restriction means in the form of profiled piece 24 is secured permanently to the upper part of the wall in the compressed air pipe 12 above porous material 16 which is soldered or brazed in an opening in the steel wall of the feed pipe 10. The fixed i.e. non-variable air flow restrictions formed by the inverse T 24 and the wall of the feed pipe has the effect of forcing some of the compressed air $F_L$ to flow through the gap between the porous material 16 and the profiled piece 24. The resistance is increased to a greater or lesser degree depending on the size of the distance d so that approximately the same amount of air, in terms of weight, enters the feed pipe from the compressed air pipe through all discs 16 of porous material along the feed pipe.

In all the arrangements according to FIGS. 1 to 3 the distance d, that is, the air flow restrictions increases in the direction of material transport. The compressed air pipe is shown very much larger than is case in practice. In reality its dimensions in cross section for a feed pipe diameter of 75 mm can be 20 mm wide and 16 mm high.

Figure 4:
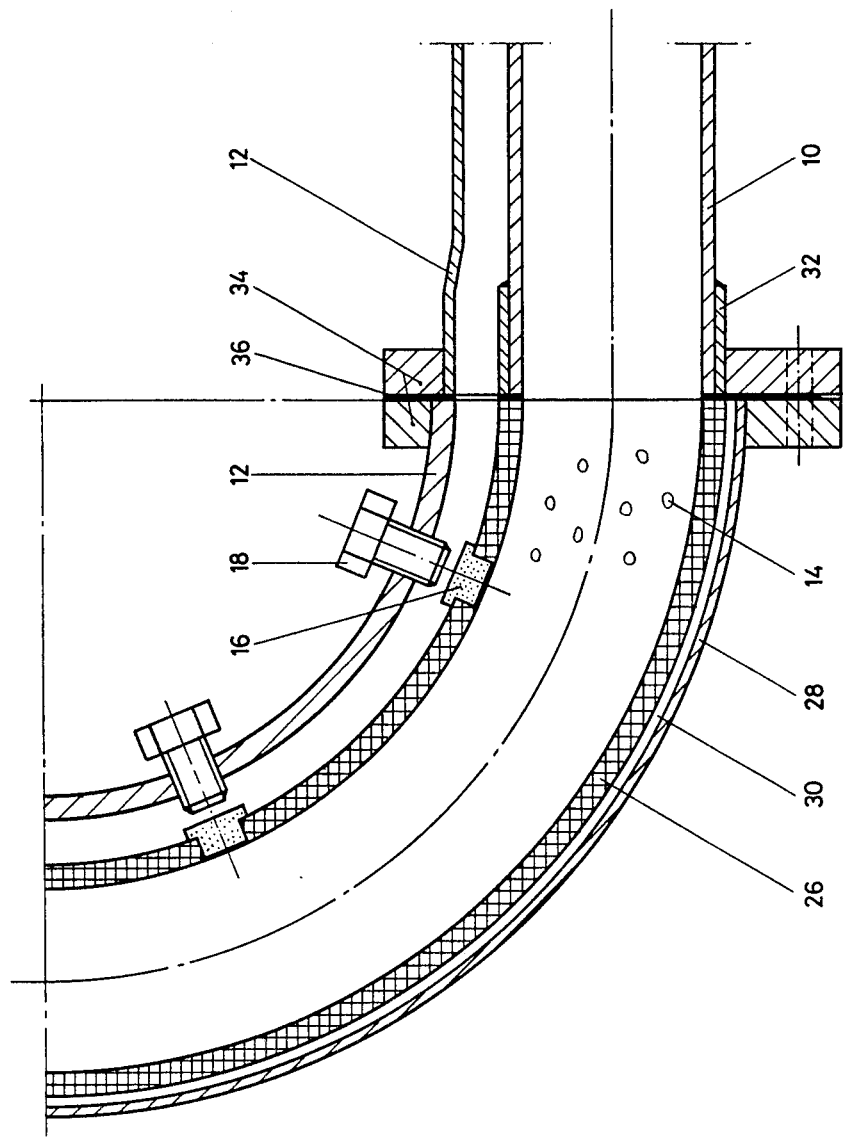
FIG. 4 is a longitudinal section through a curved piece of the feed pipe system.

FIG. 4 shows a curved piece of a feed pipe system and its junction with a straight part. Even under relatively slow dense flow conditions, the material of the curved piece is subject to a relatively high degree of wear. According to a special version of the present invention therefore a more wear-resistance insert e.g. made of sintered aluminum oxide is employed for the inner wall of the feed pipe in this curved piece.

Discs 16 of porous material are also provided in this ceramic part 26. The shock-sensitive insert 26 is embedded in a protective sleeve 28. The ring-shaped gap 30 between the wear-resistant insert 26 and the protective sleeve 28 is preferably filled with a foamed material. A strengthening ring 32 is fitted to the end of the feed pipe 10 to provide a smooth transition to the insert 26 which has a larger wall thickness. The straight and curved pipes are bolted together using flanges 34 with a flat gasket or washer 36 between them.

FIG. 5 shows a branch in the feed pipe system and shows that no switch or three-way tap is necessary. In the present case the ball valve 40a is open and ball valve 40b closed. When the magnetic valves 42 and 44 are open, the compressed air entering the feed pipe 10 from compressed air channels 12, which are provided with restrictions 38, causes the material to be conveyed through the open ball valve 40a in a dense flow pattern.

When the magnetic valve 46 closes the compressed air channel 12 the material in the pipe 10 is transported only a short way along the pipe past the branching point and forms a plug 48 there. If this plug of material is to be removed, then the magnetic valve 46 and the ball valve 40b must be opened. The compressed air flowing into pipe 10 at the restrictions sets the material in motion under dense flow conditions.

What is claimed is:
1. A feed system for transporting granular material by means of compressed air comprising:
an elongated granular material feed pipe;
an elongated compressed air feed pipe adjacent to said granular material feed pipe;
a first air flow passage means between said elongated compressed air feed pipe and said elongated granular material feed pipe for communicating compressed air from said elongated compressed air feed pipe to said elongated granular material feed pipe;
a first air flow restriction means associated with said first air flow passage means so as to define a passage $d_1$ for the passage of compressed air;
a second air flow passage means spaced from and downstream of said first air flow passage means between said elongated compressed air feed pipe and said elongated granular material feed pipe for communicating compressed air from said elongated compressed air feed pipe to said elongated granular material feed pipe;
a second air flow restriction means associated with said second air flow passage means so as to define a passage $d_2$ for the passage of compressed air wherein $d_2$ is greater than $d_1$;
a third air flow passage means between said elongated compressed air feed pipe and said elongated granular material feed pipe for communicating compressed air from said elongated compressed air feed pipe to said elongated granular material feed pipe; and a third air flow restriction means associated with said third air flow passage means so as to define a passage $d_3$ for the passage of compressed air wherein $d_3$ is greater than $d_2$.

2. A feed system according to claim 1 wherein said first, second and third air flow restriction means are positioned in said elongated compressed air pipe adjacent to and spaced from said first, second and third air flow passage means, respectively so as to define passages $d_1$, $d_2$ and $d_3$ between said first air flow restriction means and said first air flow passage means, said second air flow restriction means and said second air flow passage means and said third air flow restriction means and said third air flow passage means for the passage of compressed air wherein $d_3$ is greater than $d_2$ is greater than $d_1$.

3. A feed system according to claim 2 wherein said first, said second and said third air flow passage means comprise a porous material.

4. A feed system according to claim 3 wherein said porous material is made of a material selected from the group consisting of sintered bronze, sintered iron or sintered aluminum oxide.

5. A feed system according to claim 3 wherein the porous material is in the form of wire mesh.

6. A feed system according to claim 1 including means for varying the size of $d_3$, $d_2$ and $D_1$.

7. A feed system according to claim 1 wherein said elongated granular material feed pipe and said elongated compressed air feed pipe share a common wall.

8. A feed system according to claim 1 wherein the distance between said first and said second air flow restriction means and said second and said third air flow restriction means is between 1 to 6 times the diameter of said elongated granular material feed pipe.

9. A feed system according to claim 1 wherein said elongated granular material feed pipe comprises a curved portion and a straight portion, said curved portion comprising a shock sensitive ceramic material.

10. A feed system according to claim 1 wherein said first, said second and said third air flow restriction means comprises an adjustable bolt projecting into said elongated compressed air feed pipe.

11. A feed system according to claim 1 wherein said first, said second and said third air flow restriction means comprises fins attached to the walls of said elongated compressed air feed pipe.

* * * * *